US009934594B2

(12) United States Patent
Kuusk et al.

(10) Patent No.: US 9,934,594 B2
(45) Date of Patent: Apr. 3, 2018

(54) TEXTILE-BASED AUGMENTED REALITY SYSTEMS AND METHODS

(71) Applicant: Spell Disain Ltd., Pärnu (EE)

(72) Inventors: Kristi Kuusk, Pärnu (EE); Wouter Pieter Anton Widdershoven, Eindhoven (NL); Guido van Gageldonk, Eindhoven (NL); Leonardus Gerardus Johannus Meertens, Gemert (NL)

(73) Assignee: Spell Disain Ltd., Parnu (EE)

( * ) Notice: Subject to any disclaimer, the term of this patent is extended or adjusted under 35 U.S.C. 154(b) by 0 days.

(21) Appl. No.: 14/757,514

(22) Filed: Dec. 23, 2015

(65) Prior Publication Data

US 2017/0069114 A1 Mar. 9, 2017

Related U.S. Application Data

(60) Provisional application No. 62/216,005, filed on Sep. 9, 2015.

(51) Int. Cl.
*G06T 11/00* (2006.01)
*D05C 17/00* (2006.01)
(Continued)

(52) U.S. Cl.
CPC ............ *G06T 11/00* (2013.01); *D05C 17/00* (2013.01); *G06K 9/00671* (2013.01);
(Continued)

(58) Field of Classification Search
None
See application file for complete search history.

(56) References Cited

U.S. PATENT DOCUMENTS 5,945,656 A   8/1999 Lemelson et al.
6,661,433 B1  12/2003 Lee
(Continued)

FOREIGN PATENT DOCUMENTS

WO   WO 2005/113086 A1   12/2005
WO   WO 2011/160114 A1   12/2011
(Continued)

OTHER PUBLICATIONS

Lifeline, Tunstall Enuresis sensor, 3 pages.
(Continued)

*Primary Examiner* — Vu Nguyen
(74) *Attorney, Agent, or Firm* — Finnegan, Henderson, Farabow, Garrett & Dunner, LLP

(57) ABSTRACT

This disclosure relates generally to augmented reality, and more particularly to augmented reality systems and methods using textiles. In one embodiment, a processor-implemented textile-based augmented reality method is disclosed. The method may comprise capturing, via one or more hardware processors, a video frame including a depiction of an aperiodic marker included in an ornamental design of a textile fabric. Via the one or more hardware processors, the presence of the marker may be identified using one or more image-processing marker detection techniques. The identified marker may be associated with one or more audio-visual content files. Finally, data from the one or more audio-visual content files may be displayed as part of an augmented reality presentation.

24 Claims, 4 Drawing Sheets

(51) Int. Cl.
*G06K 19/06* (2006.01)
*G06K 9/00* (2006.01)
*G06K 9/20* (2006.01)

(52) U.S. Cl.
CPC ..... *G06K 9/2063* (2013.01); *G06K 19/06103* (2013.01); *G06T 2207/30204* (2013.01); *G06T 2210/16* (2013.01)

(56) References Cited

U.S. PATENT DOCUMENTS

| | | | |
|---|---|---|---|
| 7,849,620 B2 | 12/2010 | Hussey et al. | |
| 8,020,770 B2 | 9/2011 | Kamijo et al. | |
| 8,194,914 B1 | 6/2012 | Skogg et al. | |
| 8,308,073 B2 | 11/2012 | Lai et al. | |
| 8,547,401 B2 | 10/2013 | Mallinson et al. | |
| 9,098,498 B2 | 8/2015 | Alexeev | |
| 9,176,704 B2 | 11/2015 | Inoue | |
| 9,183,675 B2 | 11/2015 | Kim et al. | |
| 9,185,361 B2 | 11/2015 | Curry | |
| 9,200,204 B2 | 12/2015 | Marguerettaz et al. | |
| 9,229,540 B2 | 1/2016 | Mandella et al. | |
| 9,240,059 B2 | 1/2016 | Zises | |
| 9,262,719 B2 | 2/2016 | Soon-Shiong | |
| 9,462,107 B2 | 10/2016 | Rhoads et al. | |
| 9,477,312 B2 | 10/2016 | Hoang et al. | |
| 2006/0154559 A1 | 7/2006 | Yoshida | |
| 2007/0275207 A1* | 11/2007 | Higgins | B32B 5/16 428/95 |
| 2008/0140413 A1 | 6/2008 | Millman et al. | |
| 2008/0200249 A1 | 8/2008 | Kovach | |
| 2008/0266323 A1 | 10/2008 | Biocca et al. | |
| 2010/0294832 A1 | 11/2010 | Rathus et al. | |
| 2011/0018903 A1* | 1/2011 | Lapstun | G02B 26/06 345/633 |
| 2012/0061470 A1 | 3/2012 | Marguerettaz et al. | |
| 2012/0233076 A1 | 9/2012 | Sutcliffe et al. | |
| 2013/0207373 A1* | 8/2013 | Lucas-Woodley | G06T 11/00 281/15.1 |
| 2013/0341392 A1 | 12/2013 | Ahee | |
| 2015/0109481 A1* | 4/2015 | Hayakawa | H04N 5/265 348/239 |
| 2015/0130790 A1* | 5/2015 | Vasquez, II | G06T 19/006 345/419 |
| 2015/0370320 A1 | 12/2015 | Connor | |
| 2016/0247320 A1* | 8/2016 | Yuen | G06T 19/006 |
| 2017/0103431 A1 | 4/2017 | Shapiro et al. | |

FOREIGN PATENT DOCUMENTS

| | | |
|---|---|---|
| WO | WO 2012/018149 A1 | 2/2012 |
| WO | WO 2012/020242 A2 | 2/2012 |
| WO | WO 2014/138204 A1 | 9/2014 |
| WO | WO 2016/183629 A1 | 11/2016 |
| WO | WO 2017/049037 A1 | 3/2017 |

OTHER PUBLICATIONS

Easylink UK, EnuSens, Bed Wetting Trainer—Adult Incontinence Alarm, 2 pages.
Bedwetting-store.com, Dry-Me-Bed-Mat Treatment System: Appears to use the Caretech Enuresis sensor***with own cord, alarm box and packaging, 4 pages.
Bedwetting-store.com, Malum Ultimate: Appears to use the Caretech Enuresis sensor with own cord, alarm box and packaging, 5 pages.
Saturn Sales & Services Ltd., Tynetec Enuresis Sensor, 3 pages.
Therapee, Stopee Bedwetting Alarm: Not only a pad and alarm but also an online program, 32 pages.
Potty MD, Wet-Detective, 3 pages.
Vigilant, Vigilant Bed wetting urine alarm sensor pad mat kit for nocturnal enuresis, 7 pages.
Chummie, Chummie Pro bed-side bed wetting alarm, 10 pages.

* cited by examiner

FIG. 2A (*Prior Art*)

TEXTILE-BASED AUGMENTED REALITY SYSTEMS AND METHODS

PRIORITY CLAIM

This U.S. patent application claims priority under 35 U.S.C. § 119 to U.S. provisional patent application No. 62/216,005, filed on Sep. 9, 2015, and titled, "TEXTILE-BASED AUGMENTED REALITY SYSTEMS AND METHODS". The entire contents of the aforementioned application are incorporated herein by reference for all purposes.

TECHNICAL FIELD

This disclosure relates generally to augmented reality, and more particularly to augmented reality systems and methods using textiles.

BACKGROUND

Augmented reality is reshaping the way people interact with the world. A person's perception of real-world environments can be enhanced by augmenting that perception with artificial sensory inputs such as sounds, graphics, and sensory feedback (e.g., vibration feedback of a gaming controller). Many augmented reality platforms incorporate numerous types of sensory inputs to provide a fully immersive experience to users of the platform. Some augmented reality platforms include artificial sensory inputs that are interactive. A user may interact with these inputs and, in response, the platform may produce new or modified sensory inputs leading to an even further immersion in the augmented environment.

One type of conventional augmented reality system includes a camera and a display screen. The camera captures live video of the real-world environment and reproduces the video feed on the display screen. The system then augments the video feed of the real-world environment by overlaying computer-generated graphics onto the video feed. The system can augment the video feed based on the real-world environment being captured or the user's interaction with the video feed. For example, the system may recognize patterns on flat surfaces in the real-world environment and display augmentations on the display screen in response to detecting those patterns.

Another type of conventional augmented reality system includes a sensor and a projection display. The projection display projects an interactive graphical overlay onto flat real-world surfaces such as a floor or wall. Users of the system can interact with the projected graphical overlay by, for example, placing their hand over the projected graphical overlay. The sensor detects the presence of the user's hand disrupting the projection and modifies the projection accordingly.

The inventors here have recognized several technical problems with such conventional augmented reality systems, as explained below. For example, conventional systems that use conventional image recognition capabilities may be unable to detect patterns on surfaces that are not flat and may be unable to accommodate variations and distortions in detectable environmental patterns. As one example, a real-world environmental pattern may become wrinkled, stretched, faded, etc., and may no longer be detectable by conventional augmented reality systems. Moreover, some conventional augmented reality systems may include image recognition capabilities that cannot track displacement of detectable environmental patterns. For example, conventional systems may be unable to track a detectable pattern as a user of the conventional system moves the pattern in the environment. Still further, conventional augmented reality systems may employ technology that is deficient in detecting environmental patterns in certain mediums. For example, conventional systems may be ill-suited for detecting patterns in woven and printed materials because of certain technical problems and constrains of those materials (e.g., low contrast and local contrast in patterns, poor pattern resolution, small pattern size, surface reflections in the materials, etc.).

Further, conventional textile manufacturing techniques are well suited to creating repeating patterns, but are ill-suited to generating patterns in textiles with spatially aperiodic designs, or with unpredictable variations in the textile designs.

SUMMARY

Embodiments of the present disclosure present technological improvements as solutions to one or more of the above-mentioned technical problems recognized by the inventors in conventional augmented reality systems. For example, embodiments of the present disclosure present unique implementations that combine textiles with augmented reality systems and their associated functionality, such as story-telling. Accordingly, in one embodiment, a processor-implemented textile-based augmented reality method is disclosed. The method may comprise capturing, via one or more hardware processors, a video frame including a depiction of an aperiodic marker included in an ornamental design of a textile fabric. Via the one or more hardware processors, the presence of the marker may be identified using one or more image-processing marker detection techniques. The identified marker may be associated with one or more audio-visual content files. Finally, data from the one or more audio-visual content files may be displayed as part of an augmented reality presentation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A-B are block diagrams to illustrate exemplary aspects of textiles employed in some embodiments.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure integrate augmented reality systems with textiles. These integrated systems can detect environmental patterns on surfaces that have surface variations. For example, these integrated systems can compensate for variations and distortions in surfaces and in detectable environmental patterns and tracking the patterns as they move in the environment.

The disclosed embodiments provide textiles for use with augmented reality systems and methods. The textiles include real-world environmental patterns that are detectable by augmented reality systems and methods, yet undetectable to a user of the augmented reality systems, by incorporating the detectable patterns into larger ornamental textile designs. The disclosed textiles can improve pattern detection of augmented reality systems by improving contrast between the detectable patterns and the textiles on which the patterns are situated. Moreover, the disclosed textiles can improve pattern detection of augmented reality systems between the local contrast in the detectable patterns and the patterns situated on the same textile. Still further, the disclosed textiles can improve resolution of the detectable patterns, thereby improving pattern detection and allowing for smaller variations between different detectable patterns (thus increasing the number of available patterns for use with augmented reality systems).

Figure 1A:
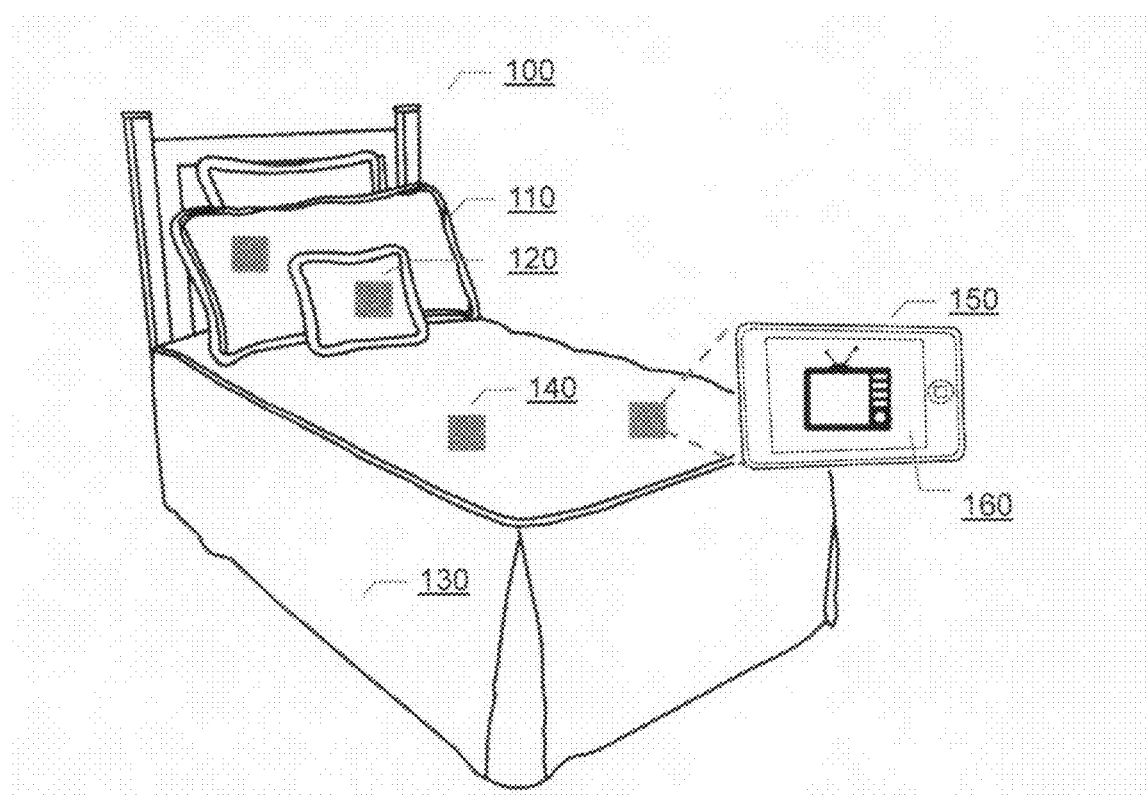
FIGS. 1A-B illustrate an exemplary implementation of an augmented reality system using textiles according to some embodiments.
Figure 1B:
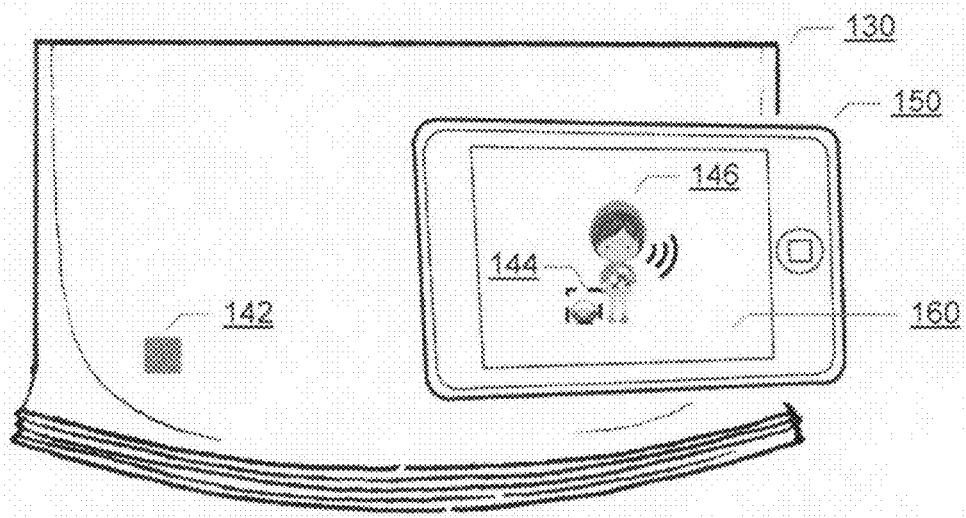

FIGS. 1A-B illustrate an exemplary implementation of an augmented reality system using textiles according to some embodiments. With reference to FIG. 1A, in some embodiments, a furniture set 100 may include a number of components, including a number of textile components. For example, furniture set 100 may include pillow covers 110 and 120, and a bed sheet 130. Any type of textile may be alternatively used in this exemplary implementation. Such textile may include ornamental designs, as discussed above. Included within these ornamental design may be certain patterns serving as markers for triggering augmented reality visualization. For example, a marker 140 may be included within the larger ornamental design of bed sheet 130. A user may utilize a camera included with a device, such as a tablet computer or smartphone 150, to scan the textiles such as bed sheet 130. The device 150 may be any kind of smart device, such as a smartphone, tablet computer, notebook, or the like. The smart device may include one or more computer-readable media storing computer program instructions that can be executed by one or more hardware processors included within the device 150. The instructions may include instructions to implement any of the features described herein. The device 150 may capture a video frame including the marker 140. An application executing on the device 150 may be performing an image processing procedure to identify markers included within the textile ornamental design. Upon image processing a video frame including a marker captured by the camera of the device 150, the device 150 may detect the presence of the marker within the ornamental design of the textile. In response to such detection, the device 150 may trigger the execution of an application providing content 160 to the user via the display and/or audio systems of the device 150. As an example of content that may be provided to the user, the application may provide graphics, text, audio clips, animations, movies, presentations, or other audio visual content to the user.

With reference to FIG. 1B, in some embodiments, a user may move device 150 over bed sheet 130. Included in the ornamental design (not shown) of bed sheet 130 may be markers 142 and 144. An application running on device 150 and the markers 142 and 144 may be designed in cooperation so that the application recognizes the patterns constituting markers 142 and 144 from the ornamental design of the bed sheet 130. For example, markers 142 and 144 may provide a local visual contrast in such a manner as may be detected by the application. In an exemplary situation where marker 144 is detected by the application, the application may present a virtual reality object 146, as part of content 160 presented to the user, at the screen pixel location coordinates where the marker 144 would have been otherwise presented. The virtual reality object 146 may be any type of audio-visual content, such as graphics, text, audio clips, animations, video clips, movies, HTML or other web content, presentations, etc.

Figure 2B:
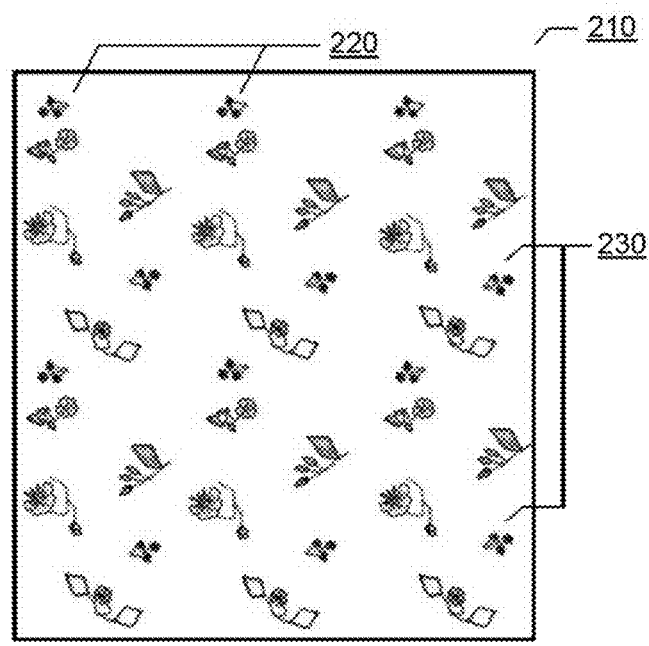
Figure 2B:
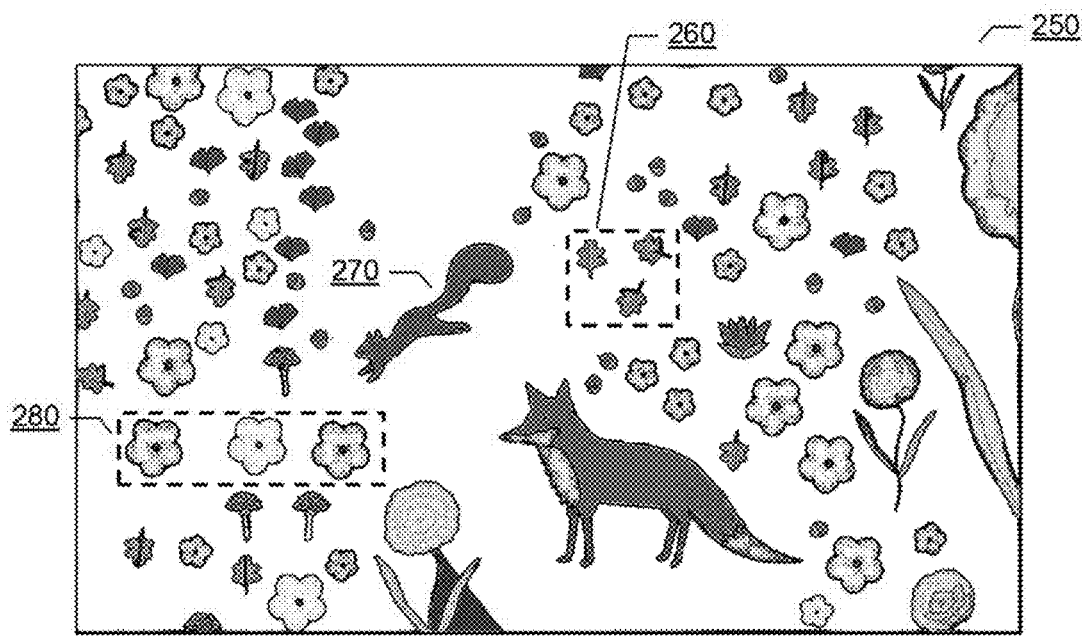

FIGS. 2A-B are block diagrams to illustrate exemplary aspects of textiles employed in some embodiments. FIG. 2A depicts a prior art textile ornamental design 210. Such conventional designs include repetition of the same patterns in the same orientations across the textile fabric. For example, element 220 marked in FIG. 2A shows a pattern repeated in the 'X' dimension (e.g., along the length of the fabric) in the same orientation each time, and element 230 shows that same pattern repeated in the 'Y' dimension (e.g., along the width of the fabric) in the same orientation each time. Conventional textile manufacturing techniques are well suited to creating such spatially repeating, similarly orientated, predictable patterns.

In contrast, FIG. 2B depicts a textile ornamental design 250 according to certain embodiments of the present disclosure. The ornamental design on the textile may be either woven or knitted or tufted by known manufacturing techniques. The ornamental design on the textile can also be printed or embroidered on a woven or knitted or tufted fabric using known methods of printing and embroidery. Any other known manufacturing technique may also be employed, appropriately modified to include patterns which are: (1) not repeated periodically in one or more spatial dimensions (see, e.g., element 280), (2) not presented in the same orientation (see, e.g., element 260), even if repeated periodically in one or more spatial dimensions, (3) not presented with the same period (spatial distance) (see, e.g., element 280), or (4) not repeated at all (e.g., even though of a small enough size that it could be repeated on the fabric) (see, e.g., 270). These patterns may be formed as part of the knitting or weaving of the textile fabric, or may be designs printed onto the fabric. In some embodiments, the textile may utilize uniquely designed woven, tufted and/or printed (e.g., digital and/or screen printed) textiles to create crisp and sharp images for quick recognition by an application executing on the device 150.

Figure 3A:
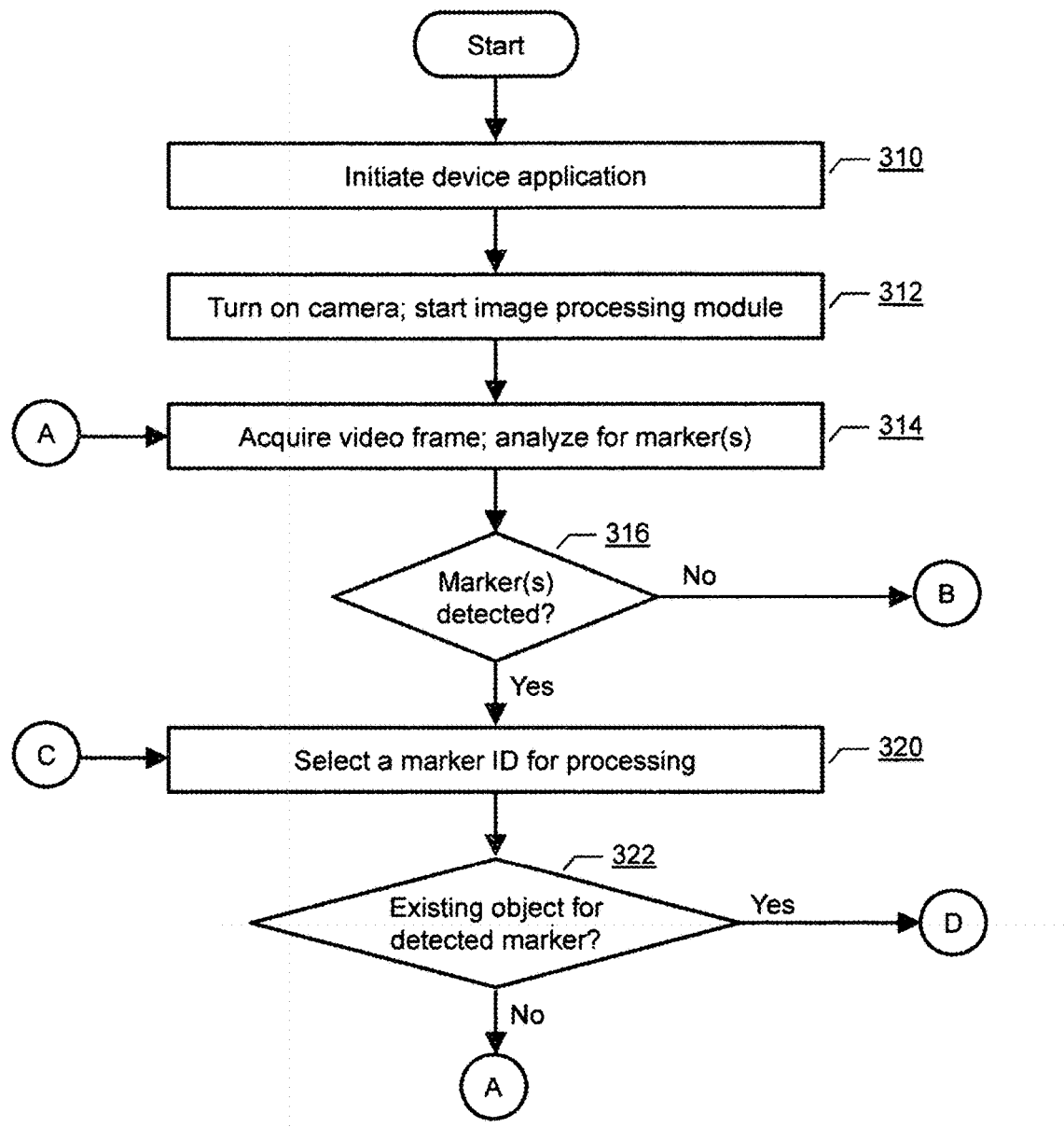
FIGS. 3A-B are flow diagrams illustrating an exemplary augmented reality method using textiles, according to some embodiments.
Figure 3B:
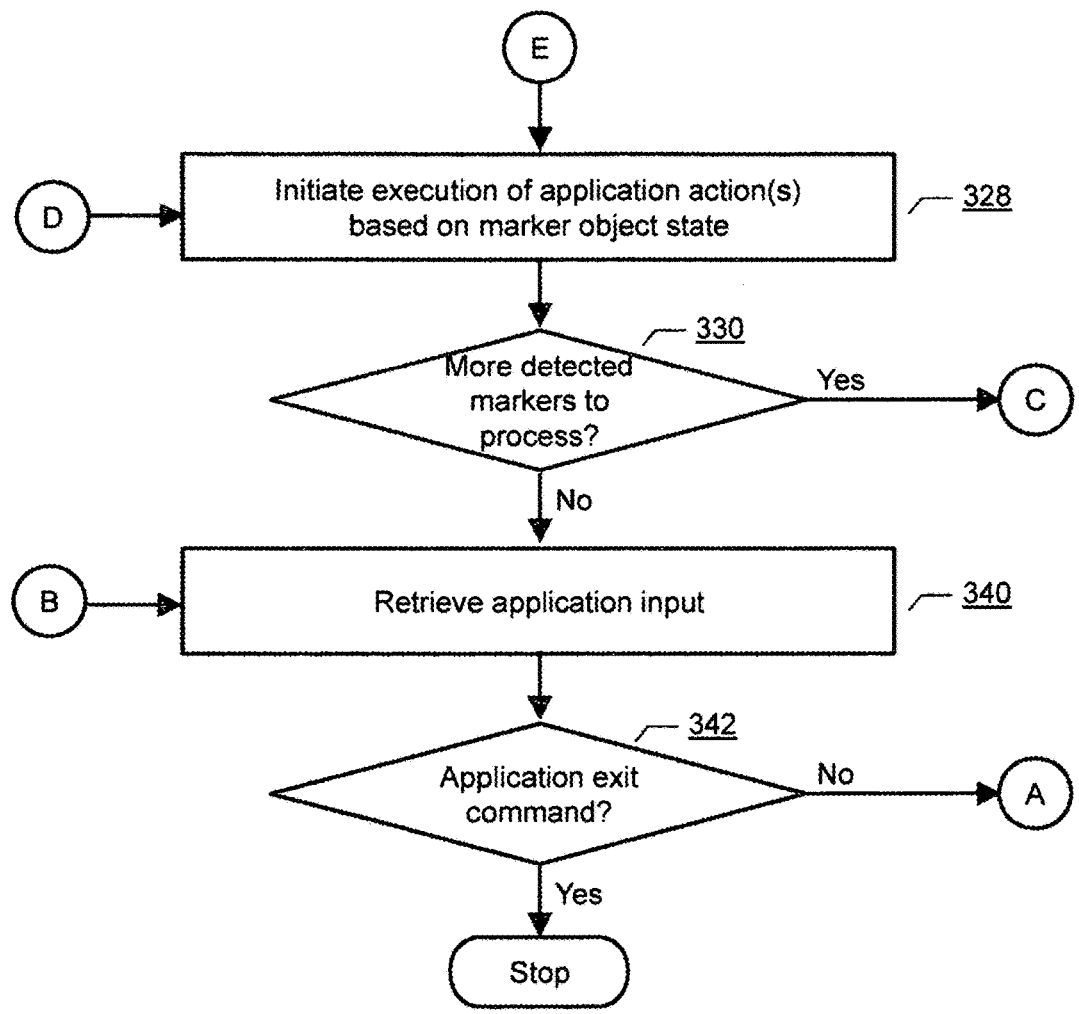

FIGS. 3A-B are flow diagrams illustrating an exemplary augmented reality method using textiles, according to some embodiments. With reference to FIG. 3A, in some embodiments, at step 310, the device 150 may instantiate a marker detection application for detecting the presence of markers in textile fabric. At step 312, the device 150 may turn on its camera and initiate the image processing module or application. At step 314, the device 150 may acquire a video frame using its camera, and analyze the video frame using image processing techniques for the presence of augmented reality markers. For example, such procedures may utilize application programming interfaces provided by existing augmented reality software for mobile devices, which enables computer vision technology to recognize and track objects in real-time. In some embodiments, the image processing techniques may be configured to identify disruptions in the periodicity of the patterns in the textile, identify patterns that do not fit within a periodic pattern of the remainder of the textile, or detect edges of the patterns where there is a high color contrast. Any known image processing techniques may be utilized for this purpose.

At step 316, if the device 150 detects any markers, the device 150 may select one of the detected marker for processing at step 320. At step 322, the device 150 may determine whether a software object has been created for that particular marker. In some embodiments, each marker that is "active" may be assigned to a particular software object. The software object may store a state associated with the marker, and may serve as a mechanism by which to pass data or other information between other application parts related to the marker. For example, the software object may store variables indicating whether the marker is active, what applications are triggered by the marker, the states of those applications, what types of user input should be passed to applications, and to which application they should be passed, and other information. If a software object does not exist for the marker (see element 322, option "No"), the device 150 may go back to step 314, acquire a video frame, and analyze the video frame of markers as described above.

With reference to FIG. 3B, in some embodiments, at step 328, based on the state of the marker object, the device 150 may initiate execution of an application or application action, such as an interactive game. The application may provide graphics, text, audio clips, animations, movies, presentations, or other audio visual content to the user. At step 330, the device 150 may determine whether there are additional detected markers to process, and may repeat the above procedure as necessary for each additional marker to process.

At step 340, the device 150 may retrieve application input. For example, a user may provide user input, e.g., as touch input, keyboard entries, voice input (e.g., to a digital assistant), etc. to the application. In some examples, the device 150 may present graphical user interface controls, which the user may use to provide the user input. The device 150 may process the application input to provide various features for the user. If the user provides an input to exit the application (see step 342), the device 150 may terminate processing; otherwise, the device may go back to step 314, acquire a video frame, and analyze the video frame of markers as described above.

The specification has described augmented reality systems and methods using textiles. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A textile-based augmented reality system, comprising:
one or more hardware processors; and
one or more memory units storing instructions executable by the one or more hardware processors to perform acts comprising:
capturing, via the one or more hardware processors, a video frame including a depiction of an aperiodic marker included in an ornamental design of a textile fabric;
identifying, via the one or more hardware processors, the presence of the marker using one or more image-processing marker detection techniques to analyze the ornamental design of the textile fabric;
wherein identifying the presence of the marker using the one or more image-processing marker detection techniques to analyze the ornamental design of the textile fabric is performed by comparing, via the one or more hardware processors, the aperiodic marker to the ornamental design of the textile fabric in which the aperiodic marker is included to identify as the aperiodic marker a disruption in a periodicity of the ornamental design of the textile fabric including a pattern not presented in a same orientation as in the ornamental design of the textile fabric;
associating, via the one or more hardware processors, the identified marker with one or more audio-visual content files; and
displaying, via the one or more hardware processors, data from the one or more audio-visual content files as part of an augmented reality presentation.

2. The system of claim 1, wherein the textile fabric is a woven fabric and the marker is created using a weave design in the woven fabric.

3. The system of claim 1, wherein the textile fabric is a woven fabric and the marker is printed on the woven fabric.

4. The system of claim 1, wherein the textile fabric is a woven fabric and the marker is embroidered on the woven fabric.

5. The system of claim 1, wherein the textile fabric is a knitted fabric and the marker is created using a knit design in the knitted fabric.

6. The system of claim 1, wherein the textile fabric is a nonwoven fabric and the marker is printed on the nonwoven fabric.

7. The system of claim 1, wherein the textile fabric is a nonwoven fabric and the marker is embroidered on the nonwoven fabric.

8. The system of claim 1, wherein the textile fabric is a tufted fabric and the marker is created using a tuft design in the tufted fabric.

9. The system of claim 1, wherein the textile fabric is a tufted fabric and the marker is printed on the tufted fabric.

10. A processor-implemented textile-based augmented reality method, comprising:

capturing, via one or more hardware processors, a video frame including a depiction of an aperiodic marker included in an ornamental design of a textile fabric;

identifying, via the one or more hardware processors, the presence of the marker using one or more image-processing marker detection techniques to analyze the ornamental design of the textile fabric;

wherein identifying the presence of the marker using the one or more image-processing marker detection techniques to analyze the ornamental design of the textile fabric is performed by comparing, via the one or more hardware processors, the aperiodic marker to the ornamental design of the textile fabric in which the aperiodic marker is included to identify as the aperiodic marker a disruption in a periodicity of the ornamental design of the textile fabric including a pattern not presented in a same orientation as in the ornamental design of the textile fabric;

associating, via the one or more hardware processors, the identified marker with one or more audio-visual content files; and displaying, via the one or more hardware processors, data from the one or more audio-visual content files as part of an augmented reality presentation.

11. The method of claim 10, wherein the textile fabric is a woven fabric and the marker is created using a weave design in the woven fabric.

12. The method of claim 10, wherein the textile fabric is a woven fabric and the marker is printed on the woven fabric.

13. The method of claim 10, wherein the textile fabric is a woven fabric and the marker is embroidered on the woven fabric.

14. The method of claim 10, wherein the textile fabric is a knitted fabric and the marker is created using a knit design in the knitted fabric.

15. The method of claim 10, wherein the textile fabric is a knitted fabric and the marker is printed on the knitted fabric.

16. The method of claim 10, wherein the textile fabric is a knitted fabric and the marker is embroidered on the knitted fabric.

17. The method of claim 10, wherein the textile fabric is a nonwoven fabric and the marker is printed on the nonwoven fabric.

18. The method of claim 10, wherein the textile fabric is a nonwoven fabric and the marker is embroidered on the nonwoven fabric.

19. The method of claim 10, wherein the textile fabric is a tufted fabric and the marker is created using a tuft design in the tufted fabric.

20. The method of claim 10, wherein the textile fabric is a tufted fabric and the marker is printed on the tufted fabric.

21. The method of claim 10, wherein the marker is contrasted from a remainder of the ornamental design by an orientation of the marker relative to the ornamental design.

22. The method of claim 10, wherein the marker is contrasted from a remainder of the ornamental design by a relative spacing between the marker and other elements of the ornamental design.

23. The method of claim 10, wherein the marker is contrasted from a remainder of the ornamental design by a color scheme of the marker.

24. The method of claim 10, wherein the marker is contrasted from a remainder of the ornamental design by a shape of the marker.

* * * * *